United States Patent
Prieto et al.

(10) Patent No.: US 7,528,080 B2
(45) Date of Patent: May 5, 2009

(54) AQUEOUS POLYOLEFIN DISPERSIONS FOR TEXTILE IMPREGNATION

(75) Inventors: Miguel A. Prieto, Richterswil (CH); Ronald Wevers, Terneuzen (NL); James G. Kennedy, Briston (GB); Aaron M. Bujnowski, Frisco, TX (US); Brad Maurice Moncla, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 400 days.

(21) Appl. No.: 11/300,993

(22) Filed: Dec. 15, 2005

(65) Prior Publication Data

US 2007/0141933 A1   Jun. 21, 2007

(51) Int. Cl.
*B32B 27/04* (2006.01)
(52) U.S. Cl. .......................... 442/103; 442/49
(58) Field of Classification Search .......... 442/59, 442/104, 103
See application file for complete search history.

(56) References Cited

U.S. PATENT DOCUMENTS 5,614,049 A * 3/1997 Kohlhammer et al. ....... 156/221

2005/0271888 A1 * 12/2005 Moncla et al. .............. 428/523

FOREIGN PATENT DOCUMENTS

GB    1065418    4/1967

* cited by examiner

*Primary Examiner*—Lynda Salvatore

(57) ABSTRACT

The present invention provides an article formed by impregnating a fibrous structure with a compound, the compound including an aqueous dispersion, the dispersion having (a) at least one polymer selected from the group consisting of an ethylene-based thermoplastic polymer, a propylene-based thermoplastic polymer, and mixtures thereof; (b) at least one polymeric stabilizing agent; and (c) water; and removing at least a portion of the water from the impregnated fibrous structure. The present invention also provides a method of forming a stiffened textile. The method may include the steps of: forming a compound, the compound including an aqueous dispersion having (a) at least one polymer selected from the group consisting of an ethylene-based thermoplastic polymer, a propylene-based thermoplastic polymer, and mixtures thereof, (b) at least one polymeric stabilizing agent, and (c) water; impregnating a textile with the compound; and removing at least a portion of the water from the impregnated textile.

19 Claims, 2 Drawing Sheets

AQUEOUS POLYOLEFIN DISPERSIONS FOR TEXTILE IMPREGNATION

BACKGROUND OF INVENTION

1. Field of the Invention

The present invention relates generally to aqueous dispersions and dispersion compounds that optionally include a filler. More specifically, the present invention relates to dispersions that are useful in the shoe industry.

2. Background Art

Many shoes incorporate stiffeners, such as toe boxes (a.k.a. toe cap, toe puff) and counters to retain the shape of the shoe throughout the active life of the shoe. A counter is a piece of heavy leather or other stiffening material inserted between the outside and the lining of the upper at the back part of the shoe. The purpose of the counter is to strengthen the back part of the shoe and to prevent it from sagging and losing its shape. A toe box is a stiffener used to maintain the shape of a shoe toe, preserve toe room within the shoe, and give reasonable protection to the wearer's foot.

Processes used for the manufacture of base sheets for stiffener production include filmic processes, impregnation processes, and sintering. The preferred process to employ often depends upon the desired stiffness of the finished product. For example, there are three types of toe boxes: rigid, flexible, and soft. Rigid toes include safety shoes. Flexible toes may be flexed by thumb pressure, yet have semi-rigid walls. Soft toes include those which are intended to merely preserve the toe form and give maximum comfort to the wearer. A filmic process may be preferred for a rigid safety shoe, as materials prepared by a filmic process are often more resilient compared to impregnated materials.

In a filmic process, a thermoplastic sheet can be extruded and laminated to a low weight textile (typically 20 g/m$^2$), followed by hot melt coating of a polyurethane or polyamide adhesive. The function of the fabric is to provide a compatible layer between the extruded sheet and the adhesive layer. For example, in U.S. Pat. No. 4,814,037, a shoe stiffener is formed from multilayer coextruded plastics.

In a sintering process, a thermoplastic powder, such as a polycaprolactone or a PVC-polycaprolactone (e.g. TONE™, a linear polycaprolactone polyester available from The Dow Chemical Company) is applied onto a textile and sintered in an oven. For example, German Patent No. 2,621,195, discloses stiffening materials which are produced by melting powdered mixtures of plastics and fillers onto textile fabrics. Adhesives are then used to bind the stiffener to other parts of a shoe. In U.S. Pat. No. 4,717,496, the polyester used in the stiffening composition has both binding and adhesive properties.

In an impregnation process, a textile is impregnated with an emulsion or with a polymer solution. Impregnation systems can be water based or solvent based, and include SBR, natural and polychloroprene latexes, and styrenic polymers. The compatibility of the stiffener, fabric, and any adhesives used during shoe construction can affect the resiliency (lasting), stiffness, and shape retention of the stiffener and the shoe. For example, in GB 935,001, a heat activable shoe stiffener blank formed as a fibrous base is loaded or impregnated with PS, PVC, PVA, or an SB copolymer resin that stiffens after exposure to a solvent or to a temperature of 100° C., yet remains softenable such that the material can be reshaped as needed. U.S. Pat. No. 4,507,357, further adds to the stiffening composition a plasticizer and an aminoplast. In both of these patents, low temperature processability was desired so as to protect other shoe parts from damage during manufacture.

U.S. Pat. No. 6,391,380 discloses a stiffener composition which includes a latex forming resin and a powder adhesive polyester resin. To avoid softening during storage or exposure to moderate temperatures, U.S. Pat. No. 3,961,124 employs a stiffening composition having a crosslinkable resin and a peroxide initiator, thermosetting the stiffener during shoe manufacture.

Combinations of the above processes can also be used. For example, In U.S. Pat. No. 3,708,332, fabrics were impregnated with mixtures containing polystyrene and styrene-butadiene copolymers and coated with polycaprolactone to form shoe stiffener sheets.

Other patents related to stiffening compositions and shoe stiffeners include U.S. Pat. Nos. 3,284,872, 3,778,251, and 3,961,124; British Patents GB 2,102,851, 2,091,768, 2,024,279, 1,065,418, 1,062,498, and 1,036,790, and WO2003/000810, among others.

Impregnated systems incorporating SBR, SB, polychloroprene, or a blend of polychloroprene and natural latex are common, as noted above. Each of these systems has drawbacks such as poor resiliency, elasticity, cost, curing requirements, and allergic properties, as well as potentially poor compatibility with other components in the shoe structure. In view of these drawbacks, there exists a need for suitable replacements for or alternatives to conventional latex stiffening compositions.

SUMMARY OF INVENTION

In one aspect, the present invention relates to a stiffening composition including a thermoplastic polyolefin that is formed as an aqueous dispersion suitable for impregnating a fibrous structure. In another aspect, a fibrous structure impregnated with such a stiffening composition can provide adequate stiffness, elasticity, resilience, adhesion, and shape retention for use in shoe stiffeners, such as toe boxes, counters, and the like. Use of a thermoplastic polyolefin stiffening composition is advantageous because it can further provide improved compatibility with other components in the shoe structure.

The present invention provides an article formed by impregnating a fibrous structure with a compound, the compound including an aqueous dispersion, and thereafter removing at least a portion of the water from the impregnated fibrous structure. The aqueous dispersion can include (a) at least one polymer selected from the group consisting of an ethylene-based thermoplastic polymer, a propylene-based thermoplastic polymer, and mixtures thereof, (b) at least one polymeric stabilizing agent; and (c) water.

The present invention also provides a method of forming a stiffened textile product comprising the steps of forming a compound, the compound including an aqueous dispersion containing at least one polymer selected from the group consisting of ethylene-based thermoplastic polymers, propylene-based thermoplastic polymers, and mixtures thereof, and thereafter impregnating a suitable textile with the compound, and allowing the impregnated textile to stiffen by removing at least a portion of the water from the impregnated textile structure. The method may include the steps of: forming a compound, the compound including an aqueous dispersion having (a) at least one polymer selected from the group consisting of an ethylene-based thermoplastic polymer, a propylene-based polymer, and mixtures thereof, (b) at least one polymeric stabilizing agent; and (c) water; impregnating the textile with the compound; and allowing the impregnated textile to stiffen. The impregnation and stiffening steps may be carried out by suitable methods known to those skilled in the art Other aspects and advantages of the invention will be apparent from the following description and the appended claims.

DETAILED DESCRIPTION

Figure 1:
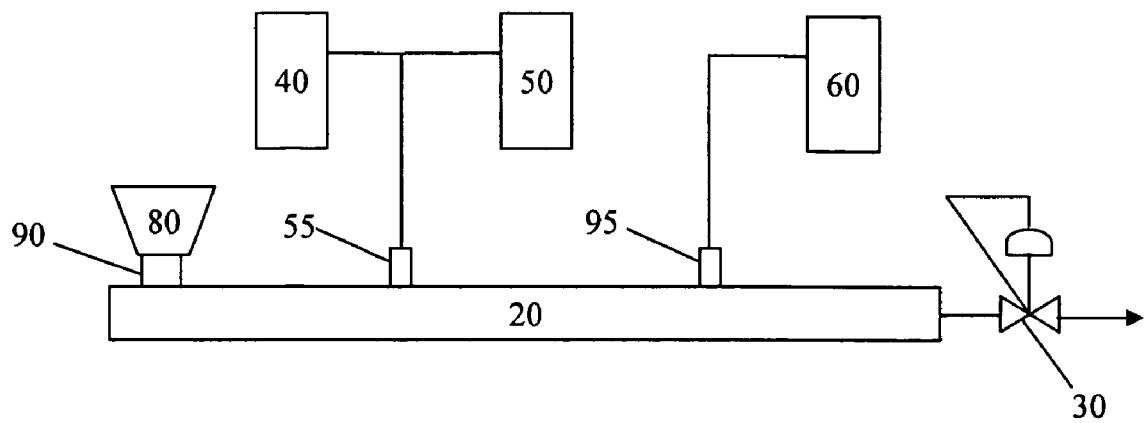
FIG. 1 shows an extruder that may be used in formulating dispersions in accordance with embodiments of the present invention.

Embodiments of the present invention relate to articles manufactured by impregnating a fibrous structure with a dispersion that includes a base polymer and a stabilizing agent. The compositions thus formed are particularly useful in the shoe industry. Embodiments of the present invention are useful for manufacturing shoe stiffeners, such as toe boxes, counters, or the like.

In certain embodiments, a filler can be added to the dispersion to form a dispersion compound. For simplicity and clarity, dispersions and dispersion compounds will generally be referred to as dispersions herein.

As used herein, "copolymer" refers to a polymer formed from two or more comonomers. As used herein, "interpolymer" refers to a copolymer in which the monomer units (two or more) are so intimately distributed in the polymer molecule that the substance is essentially homogeneous in chemical composition.

Base Polymers

Embodiments of the present invention employ ethylene-based polymers, propylene-based polymers, and propylene-ethylene copolymers as one component of a composition.

In selected embodiments, one component is formed from ethylene-alpha olefin copolymers or propylene-alpha olefin copolymers. In particular, in preferred embodiments, the base polymer comprises one or more non-polar polyolefins.

In specific embodiments, polyolefins such as polypropylene, polyethylene, and copolymers thereof, and blends thereof, as well as ethylene-propylene-diene terpolymers, may be used. In some embodiments, preferred olefinic polymers include homogeneous polymers described in U.S. Pat. No. 3,645,992 issued to Elston; high density polyethylene (HDPE) as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, are also suitable in some embodiments. Of course, blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments single site catalysts may be used.

In some particular embodiments, the polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured $^{13}C$ NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}C$ NMR spectra.

In other particular embodiments, the base polymer may be ethylene vinyl acetate (EVA) based polymers.

Those having ordinary skill in the art will recognize that the above list is a non-comprehensive listing of suitable polymers. It will be appreciated that the scope of the present invention is restricted by the claims only.

Stabilizing Agent

Embodiments of the present invention use a stabilizing agent to promote the formation of a stable dispersion or emulsion. In selected embodiments, the stabilizing agent may be a surfactant, a polymer (different from the base polymer detailed above), or mixtures thereof. In certain embodiments, the stabilizing agent is a polar polymer, having a polar group as either a co-monomer or grafted monomer. In preferred embodiments, the stabilizing agent comprises one or more polar polyolefins, having a polar group as either a co-monomer or grafted monomer. Typical polymers include ethylene-acrylic acid (EAA) and ethylene-methacrylic acid copolymers, such as those available under the tradenames PRIMACOR™, NUCREL™, and ESCOR™ and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Those having ordinary skill in the art will recognize that a number of other useful polymers may also be used.

If the polar group of the polymer is acidic or basic in nature, the stabilizing polymer may be partially or fully neutralized with a neutralizing agent to form the corresponding salt. For example, for EAA, the neutralizing agent is a base, such as ammonium hydroxide or potassium hydroxide. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, or a non-ionic surfactants. Examples of anionic surfactants include sulfonates, carboxylates, and phosphates.

Examples of cationic surfactants include quaternary amines. Examples of non-ionic surfactants include block copolymers containing ethylene oxide and silicone surfactants. Surfactants useful in the practice of the present invention can be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

Fillers

Embodiments of the present invention employ a filler as part of the composition. In the practice of the present invention, a suitable filler loading in a polyolefin dispersion can be from about 0 to about 600 parts of filler per hundred parts of polyolefin. In certain embodiments, the filler loading in the dispersion can be from about 0 to about 200 parts of filler per hundred parts of a combined amount of the polyolefin and the polymeric stabilizing agent. The filler material can include conventional fillers such as milled glass, calcium carbonate, aluminum trihydrate, talc, antimony trioxide, fly ash, clays (such as bentonite or kaolin clays for example), or other known fillers.

Formulations

In preferred formulations, therefore, dispersions in accordance with the present invention may include a base polymer, which comprises at least one non-polar polyolefin, a stabilizing agent, which comprises at least one polar polyolefin, and optionally a filler. With respect to the base polymer and the stabilizing agent, in preferred embodiments, the at least one non-polar polyolefin may comprise between about 30% to 99% (by weight) of the total amount of base polymer and stabilizing agent in the composition. More preferably, the at least one non-polar polyolefin comprises between about 50% and about 80%. Still more preferably, the one or more non-polar polyolefins comprise about 70%.

With respect to the filler, typically, an amount greater than about 0 to about 1000 parts per hundred of the polymer (polymer meaning here the non-polar polyolefin combined with the stabilizing agent) is used. In selected embodiments, between about 50 to 250 parts per hundred are used. In selected embodiments, between about 10 to 500 parts per hundred are used. In still other embodiments, from between about 20 to 400 parts per hundred are used. In other embodiments, from about 0 to about 200 parts per hundred are used.

These solid materials are preferably dispersed in a liquid medium, which in preferred embodiments is water. In preferred embodiments, sufficient base is added to neutralize the resultant dispersion to achieve a pH range of between about 6 to about 14. In preferred embodiments, sufficient base is added to maintain a pH of between about 9 to about 12. Water content of the dispersion is preferably controlled so that the solids content is between about 1% to about 74% (by volume). In another embodiment, the solid content is between about 25% to about 74% (by volume). In particularly preferred embodiments, the solids range is between about 30% to about 50% (without filler, by weight).

In certain embodiments, a fibrous structure or textile impregnated with a compound can have a combined amount of the at least one polymer and the polymeric stabilizing agent in the range of about 10 to about 150 parts per hundred parts by weight of the textile. In other embodiments, a fibrous structure or textile impregnated with a compound can have a combined amount of the filler, the at least one polymer and the polymeric stabilizing agent in the range of about 10 to about 600 parts per hundred parts by weight of the textile; from about 10 to about 300 parts in other embodiments.

Dispersions formed in accordance with embodiments of the present invention are characterized in having an average particle size of between about 0.3 to about 3.0 microns. In other embodiments, dispersions have an average particle size of from about 0.5 µm to about 2.7 µm. In other embodiments, from about 0.8 µm to about 1.2 µm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes can be measured on a Beckman-Coulter LS230 laser-diffraction particle size analyzer or other suitable device.

For example, a formulation of the present invention can include surfactants, frothing agents, dispersants, thickeners, fire retardants, pigments, antistatic agents, reinforcing fibers, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent can be included in a composition of the present invention at a concentration of at least about 0.5 part per 100 parts of filler, by weight.

Furthermore, embodiments of the present invention may optionally include a thickener. Thickeners can be useful in the present invention to increase the viscosity of low viscosity dispersions. Thickeners suitable for use in the practice of the present invention can be any known in the art such as for instance poly-acrylate type or associate non ionic thickeners such as modified cellulose ethers. For example, suitable thickeners include ALCOGUM™ VEP-II (trade name of Alco Chemical Corporation), RHEOVIS™ and VISCALEX™ (trade names of Ciba Ceigy), UCAR® Thickener 146, or ETHOCEL™ or METHOCEL™ (trade names of the Dow Chemical Company) and PARAGUM™ 241 (trade name of Para-Chem Southern, Inc.), or BERMACOL™ (trademark of Akzo Nobel) or AQUALON™ (trademark of Hercules) or ACUSOL® (trademark of Rohm and Haas). Thickeners can be used in any amount necessary to prepare a dispersion of desired viscosity.

The ultimate viscosity of the dispersion is, therefore, controllable. Addition of the thickener to the dispersion including the amount of filler can be done with conventional means to result in viscosities as needed. Viscosities of thus dispersions can reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

In a specific embodiment, a base polymer, a stabilizing agent, and a filler are melt-kneaded in an extruder along with water and a neutralizing agent, such as ammonia, potassium hydroxide, or a combination of the two to form a dispersion compound. Those having ordinary skill in the art will recognize that a number of other neutralizing agents may be used. In some embodiments, the filler may be added after blending the base polymer and stabilizing agent. In other preferred embodiments, the filler may be added after the dispersion is formed.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Pat. No. 6,455,636.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Resin in the form of pellets, powder or flakes is fed from the feeder 80 to an inlet 90 of the extruder 20 where the resin is melted or compounded. In some embodiments, the dispersing agent is added to the resin through and along with the resin and in other embodiments, the dispersing agent is provided separately to the twin screw extruder 20. The resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

Advantageously, by using an extruder in certain embodiments, the base polymer and the stabilizing agent may be blended in a single process to form a dispersion. Also, advantageously, by using one or more of the stabilizing agents listed above, the dispersion is stable with respect to the filler and other additives. Prior formulations involving polyolefin base polymers were unstable with respect to the filler.

Advantageously, polyolefin dispersions formed in accordance with the embodiments disclosed herein provide the ability to apply the dispersion to or to impregnate the dispersion into films, sheets, fabrics, or fibers and achieve good adhesive properties, and to maintain a flexible laminate. In specific embodiments, the inventors have also discovered that dispersions disclosed herein have good adhesion to polar substrates.

In some embodiments, a polyolefin dispersion or dispersion compound may be applied to a fibrous structure using any application method known to those skilled in the art. In other embodiments, a fibrous structure may be impregnated with a polyolefin dispersion or dispersion compound. In certain embodiments, fibrous structures can include textiles, geotextiles, and natural fibers. In certain embodiments, the fibrous structure may be cotton, wool, synthetic wool, cellulosics including rayon, synthetic fibers of polyamide, polyacrylonitrile, polyvinyl chloride, polyvinylidene chloride, polypropylenes, polyesters, or combinations thereof. In other embodiments, the fibrous structure may be flax, hemp, cellulose, pulp, wood, or combinations thereof.

When preparing foams, it is often preferred to froth the dispersion. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed polyolefin backing, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers can include, for example, sulfates, succinamates, and sulfosuccinamates.

Figure 2:
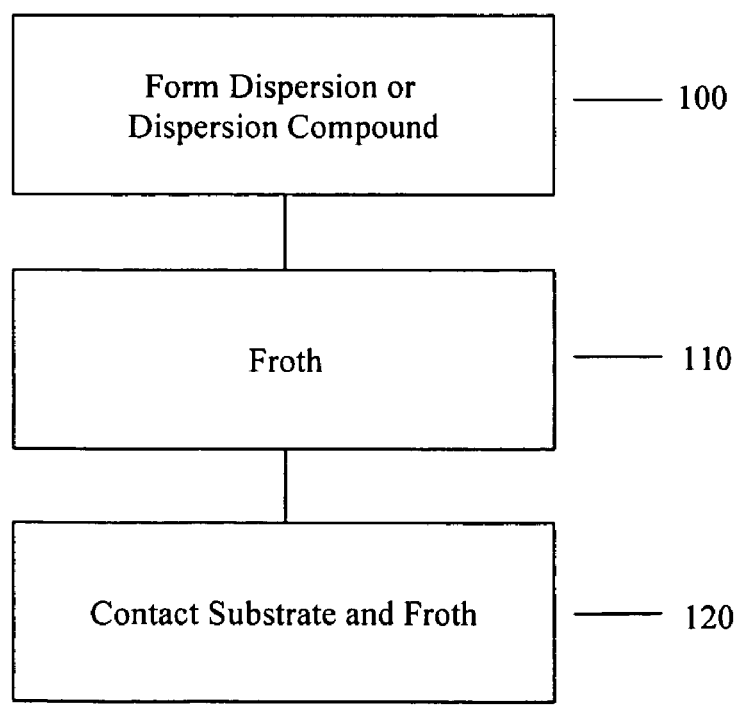
FIG. 2 shows a flowchart illustrating a method in accordance with an embodiment of the present invention.

In one embodiment of the present invention, shown in flowchart form in FIG. 2, a polyolefin dispersion is formed (ST 100). Next, the dispersion is frothed (ST 110), which may, for example, be done by mechanically mixing with air. A fabric, fiber, sheet, or film is then contacted with the froth (ST 120). For example, the froth can be coated or spread onto a fabric, or a fabric can be immersed in the froth. In selected embodiments, the polyolefin dispersion is applied at about 65° C. to about 125° C. In other embodiments, the polyolefin dispersion is applied at about 70° C. to about 120° C. In preferred embodiments, the polyolefin dispersion is applied at about 85° C. to about 95° C.

Impregnation Control

The amount or degree to which a fibrous structure is impregnated with the compound or dispersion compound can be controlled. For example, impregnation can be controlled by pressing the fabric between calenders, removing excess material. Impregnation can additionally be controlled, for example, by adjusting one or more of the viscosity of the compound, the concentration of the combined polymer and stabilizer in the aqueous dispersion, the concentration of the filler in the compound, or the polarity of the aqueous dispersion.

In certain embodiments, the impregnated textile can have a combined amount of the at least one polymer and the polymeric stabilizing agent in the range of about 15 to about 75 parts per hundred by weight of the impregnated textile. To maintain the desired degree of impregnation, for example, in certain embodiments, the polyolefin can be controlled in the range from about 35 to about 55 percent by weight of the aqueous dispersion. In other embodiments, the polyolefin can be controlled in the range from about 40 to about 50 percent by volume of the aqueous dispersion. In other embodiments, the viscosity of the compound can be controlled in the range from about 20 to about 3000 cP.

One skilled in the art will appreciate that a desirable degree or amount of impregnation can range from a partial saturation of the fibrous structure to a complete saturation of the fibrous structure. The desired degree of impregnation can depend upon variables including the nature of the fiber being impregnated and the nature of impregnate, for example. One skilled in the art will also appreciate that the intended end properties of the impregnated structure will influence the selection of the specific ingredients (fibers and dispersions, for example) and processing parameters.

In a particular embodiment, a fibrous structure impregnated with a polyolefin dispersion can be used as a stiffener in shoes. For example, a fibrous structure can be impregnated, formed, and dried, where the forming results in an upper assembly stiffener, such as a counter or a toe puff (toe box), which can be incorporated into a shoe to assist in retaining the respective portions of the shoe in a desired configuration.

EXAMPLES

Polymer dispersions. Two polyolefin dispersions were used throughout these examples, and comprised a base polymer/stabilizing agent mix. The first was formed using a VERSIFY™ DP4200/PRIMACOR™ 5980I mixture, and the second using an ENGAGE™ 8200/PRIMACOR™ 5980I mixture, each of which is available from The Dow Chemical Company (Midland, MI.). PRIMACOR™ 5980I is an ethylene acrylic acid copolymer (20.5 weight percent acrylic acid; MFR of 13.8, using a 2.16 kg weight at 125° C.; 0.958 g/cc); VERSIFY™ DP4200 is a propylene-based elastomer (9 mole percent ethylene; 25 MFR, using a 2.16 kg weight at 230° C.); ENGAGE™ 8200 is an ethylene-based elastomer (ethylene-octene copolymer; 5 MI; 0.870 g/cc).

The VERSIFY™ DP4200/PRIMACOR™ 5980I dispersion was produced by simultaneously feeding DP4200 pellets at 13.9 lb/hr and 5980I pellets at 2.9 lb/hr into an extruder feed funnel. Deionized water and a 25% (w/w) aqueous solution of potassium hydroxide were pumped at 19 and 8.3 cc/min, respectively, combined, heated to about 160° C., and injected into the extruder barrel at the emulsification zone, where the barrels were operated at about 150° C. Deionized water was pumped at 90 cc/min, heated to about 110° C., and injected into the extruder barrel at the dilution section where the barrels were operated at about 80° C. Product dilution was controlled at a pressure of about 300 psig. The resulting VERSIFY™ DP4200/PRIMACOR™ 5980I dispersion had a solids content of 51.6 weight percent, a pH of about 10.0, a volume-mean particle size of about 1.0 micron as measured by a Beckman Coulter LS 230, and a polydispersity (defined as the volume-mean particle size divided by the number mean particle size) of less than 2.

The ENGAGE™ 8200/PRIMACOR™ 5980I dispersion was produced by first pre-blending 8200 pellets with 5980I pellets at a 70/30 ratio. The blend was fed as ambient pellets into the extruder feed funnel at 15 lb/hr. Deionized water and a 25% (w/w) aqueous solution of potassium hydroxide were pumped at 14.6 and 15.3 cc/min respectively, combined, heated to about 130° C., and injected into the extruder barrel at the emulsification zone, where the barrels were operated at about 130° C. Deionized water was pumped at 85 cc/min, heated to about 75° C., and injected into the extruder barrel at the dilution section where the barrels were operated at about 70° C. The diluted product passed through a back-pressure regulator set at about 300 PSIG, exited the process at about 70° C., and was collected. The resulting ENGAGE™ 8200/PRIMACOR™ 5980I dispersion had a solids content of 44.9 weight percent, a pH of 10.2, a volume-mean particle size of about 1 micron as measured by a Beckman Coulter LS 230, and a polydispersity of less than 2.

Woven textile sheets. Two cotton-polyester fabrics were supplied by Forestali Srl. for fabric impregnation experiments. Fabric "A" had a weight per square meter of 321.77 $g/m^2$ and Fabric "B" had a weight of 228.85 $g/m^2$.

Dispersion formulations. The polymer dispersion described above were used to form two dispersion compounds including a calcium carbonate filler (Hydrocarb 90 GD slurry; 62.5 weight percent solids; available from Omya). The dispersion formulations evaluated are described in Table 1 below.

TABLE 1

Polyolefin dispersion formulations.

| Dispersion | Polymer Dispersion Type | Polymer Dispersion wt. % | Filler wt. % | pH | Solids wt. % | Viscosity mPas |
|---|---|---|---|---|---|---|
| A | DP4200/Primacor 5980i | 66.5 | 32.5 | 9.94 | 54.39 | 110 |
| B | Engage 8200/ Primacor 5980i | 66.5 | 32.5 | 10.05 | 49.81 | 90 |

Polymer dispersions and the filler slurry were weighed and mixed in a standard paper latex Heidolph Bench Stirrer at 1000 rpm for 10 minutes. The viscosity was measured in a Brookfield viscometer (spindle R3 @ 100 RPM). pH was measured with a Knick Portamess pH meter. Solids were measured with a CEM Smart System 5.

Fabric Impregnation. Sheets were impregnated in a laboratory impregnation unit (Mathis Lab Padder, manufactured by Werner Mathis AG, Textile machinery, Laboratory equipment, Zurich). The impregnation process was performed in two steps. First, the fabric sheets were soaked in a dispersion, as described in Table 1 above, for 2 minutes at room temperature. The sheets were then pressed between calender rolls at room temperature to remove excess liquids. The desired weight per square meter was controlled by adjusting the pressure between rolls. The impregnated sheets were then dried in convection oven @ 130° C. for 7 minutes. Four samples were impregnated in this manner, and are described in Table 2.

TABLE 2

Impregnation conditions.

| Impregnated Sample | Fabric Type | Dispersion Formulation | Pressing Conditions Method | Dry (g) | Wet (g) | Dried (g) | Ratio | Impregnated Fabric (g/m$^2$) | Before (g/m$^2$) | Ratio |
|---|---|---|---|---|---|---|---|---|---|---|
| 1 | A | B | 3 m/min @ 1.5 bar | 10.2 | 27.92 | 17.36 | 1.71 | 556.41 | 321.77 | 1.73 |
| 2 | A | A | 3 m/min @ 1.0 bar | 10.2 | 37.2 | 23.37 | 2.3 | 749.04 | 321.77 | 2.33 |
| 3 | B | B | 3 m/min @ 1.5 bar | 6.91 | 17.22 | 11.65 | 1.69 | 373.4 | 228.85 | 1.63 |
| 4 | B | A | 3 m/min @ 1.0 bar | 6.89 | 21.85 | 14.58 | 2.12 | 467.31 | 228.85 | 2.04 |

Figure 4:
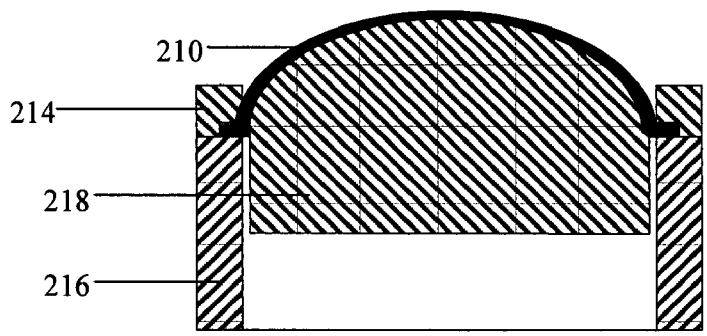
FIG. 4 is a schematic diagram of the forming tool apparatus of FIG. 3, assembled and operated so as to form a test specimen from embodiments of the present invention.
Figure 5:
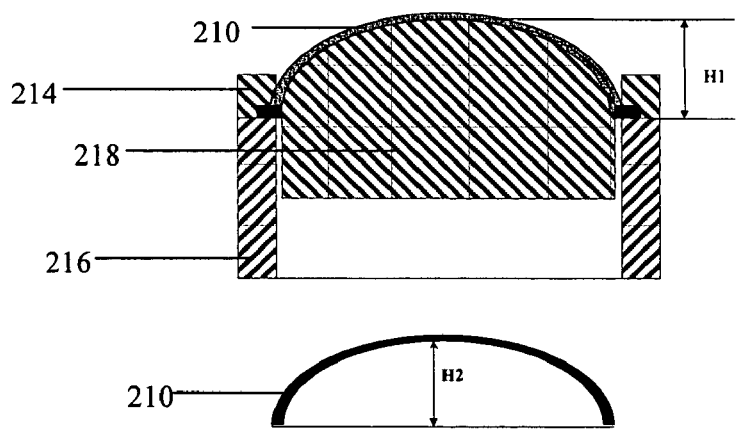
FIG. 5 illustrates the measurements obtained from the forming tool apparatus of FIG. 3 and the test specimen formed from embodiments of the present invention.

Sample Test Results. The processability and performance of the stiffeners was tested. Processability is related to VICAT and open time. Performance properties are measured according to SATRA TM83 and include hardness, area shape retention, and resiliency. For measuring these properties, a dome was thermoformed at 90° C. in a devise as illustrated in FIGS. 3, 4, and 5.

Figure 3:
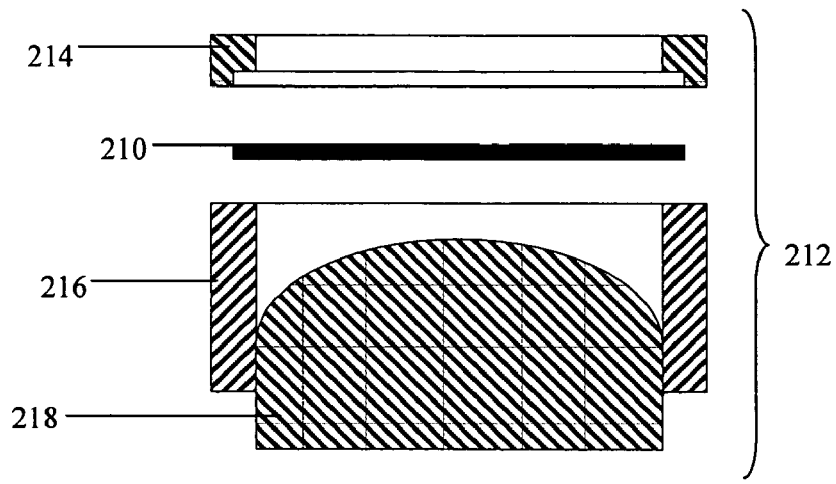
FIG. 3 is a schematic diagram of a forming tool apparatus used in testing embodiments of the present invention.

Referring to FIG. 3, a test specimen 210 was clamped in the forming tool 212, comprising a clamping ring 214, a metal cylinder 216, and a piston 218. The test specimen 210 was then heat activated by heating the assembly in an oven at 95° C. for 8.5 minutes. The heat activated assembly was removed from the oven and the test specimen 210 was promptly formed into a dome shape (within about a minute), by extending piston 218 as illustrated by FIG. 4. The formed test specimen 210 was then left in a standard controlled environment of 20° C. and 65% relative humidity in front of a fan for at least 1.5 hours.

Hardness, commonly referred to as compression strength of a formed dome, provides a measure of the strength of the stiffener in a way that corresponds to wear performance conditions. The top of the formed dome was compressed at a constant rate in a tensile testing machine using a cylindrical plunger with a level lower surface until it collapses. The maximum value was recorded as the initial hardness. This operation was repeated and after nine additional collapses, the load for the tenth collapse was measured and recorded as final hardness. Compression strength of a domed test specimen was measured according to SATRA TM83. Hardness can range from 10 N, for a fashion shoe, to 180 N for military footwear.

Area shape retention was measured according to SATRA TM83. A domed specimen was formed and the shape retention of the test specimen was determined by measuring the height of the dome. Two measurements were taken: after the first (initial compression of the dome) and a after ten collapses (final shape retention). Area shape retention is defined as:

$$ASR = 100\,(H1/H2)^2$$

where H1 is the height of the relevant forming tool (the dome of the metal mold) and H2 is the internal height of formed dome after first or tenth collapse, as illustrated in FIG. 5. The harder the stiffener, the higher the shape retention to avoid the deformation of the shoe.

Resiliency is calculated according to SATRA TM83, and is defined as the ratio of final hardness (after 10 load collapses) to initial hardness. Resiliency provides a measure of the resistance to small and large deformations during wear.

The samples prepared and tested as described above were compared to two commercial shoe stiffeners, Elastoform 172/ON (a raised cotton fabric impregnated with latex, commonly used in Toe Puffs) and Fenise 130/NL (a raised cotton fabric impregnated with latex, commonly used in Counters), each supplied by Forestali Srl.

Results of the compression force and shape retention measurements are presented in Table 3.

TABLE 3

Comparison of property test results for impregnated fabric samples.

| Test Method Property Satra TM83 | Units | 1 | 2 | 3 | 4 | Elastoform 172/ON | Fenise 130 NL |
|---|---|---|---|---|---|---|---|
| Sample thickness | mm | 0.89 | 1.08 | 0.73 | 0.79 | 0.73 | 1.23 |
| Initial Height | mm | 8.91 | 9.00 | 9.05 | 9.26 | 8.76 | 8.84 |
| Final Height | mm | 8.88 | 8.98 | 8.96 | 9.10 | 8.84 | 8.62 |
| Initial Shape retention | % | 91.20 | 93.05 | 94.09 | 98.40 | 88.15 | 89.67 |
| Final Shape retention | % | 90.48 | 92.53 | 92.12 | 95.13 | 89.77 | 85.36 |
| 1st Collapsing Load Hardness | N | 18.55 | 42.35 | 7.72 | 16.64 | 16.43 | 81.17 |
| 10th Collapsing Load Hardness | N | 13.76 | 31.97 | 5.37 | 10.83 | 11.06 | 48.00 |
| Resiliency | % | 74.20 | 75.50 | 69.60 | 65.05 | 67.32 | 59.14 |

The results shown above indicate that the inventive shoe stiffeners of the present invention offer a desirable balance of resiliency, shape retention, and hardness. Over a range of different hardness, from about 5 to about 32, the polyolefin impregnated samples 1-4 exhibited higher resiliency (greater than about 65) and higher shape retention (greater than about 90) than the Fenise sample (having resiliency of about 59 and shape retention between 85 and 90). The polyolefin impregnated textiles also exhibited similar and higher resiliency and shape retention versus the Elastoform comparative sample.

Sample 4, impregnated with the VERSIFY™ polyolefin dispersion has similar resiliency and shape retention for similar hardness as compared to the Elastoform sample. Textiles impregnated with ENGAGE™ 8200 dispersions (represented by Sample A) have similar shape retention and better resiliency compared to Elastoform grade for similar hardness.

Impregnation Control. As described above, the amount of impregnation can be controlled by pressing the fabric between calenders, removing excess material. Impregnation can additionally be controlled, for example, by adjusting one or more of the viscosity of the compound, the concentration of the combined polymer and stabilizer in the aqueous dispersion, the concentration of the filler in the compound, or the polarity of the aqueous dispersion.

As an example of controlling impregnation, experiments were performed to determine the amount of impregnation realized at various dispersion solids concentrations, targeting a 20 weight percent impregnation, with the results shown in Table 4. The dispersion used was a DP4200/PRIMACOR 5980I dispersion having an initial solids concentration of 41.4 weight percent. Fabric samples used included a Boeren Bond geophysical textile, and a Don & Low sr-PP fabric.

An impregnated fabric sample was obtained by first immersing the fabric in the dispersion. The fabric, after wetting, was removed from the dispersion and the excess was allowed to drip off of the fabric. The wetted fabric was hanged vertically and dried in an oven, with additional air drying as noted. For Sample 7, a three sheet composite was formed, where only the middle sheet was immersed, followed by drying and consolidation of the sheets.

impregnation, however still exceeding the 20 weight percent target. Further dilution to 75% water/25% original dispersion, the solution appeared to become too polar, and dispersion flow was observed to be in domains, resulting in inhomogeneous wetting of the fabric surface. The above examples illustrate that dispersion viscosity or concentration can be used to effect the degree of impregnation.

Experiment observations. Samples 6 resulted in a high clarity sheet after consolidation. In contrast, Sample 7, the sandwich composite, did not have good clarity after consolidation. Additionally, water was observed boiling out of the composite during consolidation. A drying time of 4 minutes appeared to be sufficient: the drying time for sample 9 was extended, however no additional weight loss was observed after 4 minutes.

Advantageously, one or more embodiments of the present invention provide compositions, methods, and articles having good performance in their intended applications. In one application, for example, one or more embodiments of the present invention may be used as a stiffener in shoes, such as toe puffs or counters. Additionally, one or more embodiments of the present invention provide fibrous structures impregnated with a stiffening composition having improved stiffness, elasticity, resilience, adhesion, shape retention or compatibility.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. An article formed by a process comprising:

TABLE 4

Sample conditions and results.

| | Sample | | | | | | |
|---|---|---|---|---|---|---|---|
| | 5 | 6 | 7 | 8 | 9 | 10 | 11 |
| Fabric Type | D&L | D&L | D&L | BBG | BBG | BBG | BBG |
| Initial Weight (g) | 13.7 | 13.7 | 41.1 (13.5, 13.9, 13.7) | 9.1 | 9.2 | 9.3 | 9.5 |
| Dispersion Concentration | Original | Original | Original | Diluted to 62% of original concentration | Diluted to 62% of original concentration | Diluted to 30% of original concentration | Diluted to 30% of original concentration |
| Drying Conditions | 80° C. 6 min. | 80° C. 6 min | 80° C. 6 min | 100° C. 4 min | 100° C. 8 min | 100° C. 4 min | 100° C. 4 min |
| Dry Weight (g) | 33.5 | 29.8 | 77.0 | 12.5 | 12.7 | 10.3 | 10.4 |
| Percent Impregnate | 59.1 | 54.0 | 58.3 | 27.2 | 27.6 | 9.7 | 8.7 |
| Consolidation Conditions | | 150 C., 350 kN, 3 min | 150 C., 350 kN, 3 min | | | | |
| Consolidated Weight (g) | | 29.5 | 61.6 | | | | |
| Percent Impregnate | | 53.0 | 33.3 | | | | |

The concentration/viscosity of the dispersion used for samples 5-7 was too high to reach significantly low impregnate percentages without wiping excess off of the sheet prior to drying. Although the dispersion was too viscous to produce a sheet having 20 weight percent impregnate, it was noted that the dispersion adhered very well to the fabric.

After diluting the dispersion with 50% water, the dispersion adhered well, and resulted in a lower degree of fabric impregnating a fibrous structure with a compound, the compound comprising an aqueous dispersion, wherein the aqueous dispersion comprises:

(a) at least one polymer selected from the group consisting of an ethylene-based thermoplastic polymer, a propylene-based thermoplastic polymer, and mixtures thereof; and (b) at least one polymeric stabilizing agent comprising at least one polar polymer; and (c) water;

removing at least a portion of the water from the impregnated fibrous structure.

2. The article of claim 1, wherein the ethylene-based polymer is an ethylene-alpha-olefin interpolymer.

3. The article of claim 1, wherein the propylene-based polymer is a propylene-alpha-olefin interpolymer.

4. The article of claim 1, wherein the compound further comprises at least one filler, wherein the filler comprises from greater than 0 to about 200 parts per hundred parts of the combined amount of the at least one polymer and the polymeric stabilizing agent.

5. The article of claim 1, wherein the at least one polymer comprises from about 35 to about 55 percent by volume of the aqueous dispersion.

6. The article of claim 5, wherein the at least one polymer comprises from about 40 to about 50 percent by volume of the aqueous dispersion.

7. The article of claim 1, wherein the at least one polar polymer comprises a polar polyolefin.

8. The article of claim 7, wherein the polar polyolefin comprises a partially or fully neutralized ethylene-acid copolymer.

9. The article of claim 7, wherein the polar polyolefin comprises at least one selected from the group consisting of ethylene-acrylic acid polymers, ethylene-methacrylic acid polymers, and combinations thereof.

10. The article of claim 1, wherein a combined amount of the at least one polymer and the at least one polymeric stabilizing agent comprises about 5 to about 70 volume percent of the aqueous dispersion.

11. The article of claim 1, wherein the aqueous dispersion has a pH from about 6 to about 14.

12. The article of claim 11, wherein the aqueous dispersion has a pH from about 9 to about 12.

13. The article of claim 1, wherein the aqueous dispersion has an average particle size from about 0.3 to about 3.0 microns.

14. The article of claim 13, wherein the aqueous dispersion has an average particle size from about 0.5 to about 2.7 microns.

15. The article of claim 1, wherein the fibrous structure comprises at least one selected from a woven fabrics, knitted fabrics, non-woven fabrics, and geotextiles.

16. The article of claim 1, wherein the fibrous structure comprises a natural fiber selected from the group consisting of flax, hemp, cellulose, pulp, and wood.

17. The article of claim 1, wherein the fibrous structure comprises at least one of cotton, wool, synthetic wool, cellulosics, synthetic fibers of polyamide, polyacrylonitrile, polyvinyl chloride, polyvinylidene chloride, polypropylenes, polyesters, and combinations thereof.

18. The article of claim 1, further comprising at least one selected from a wetting agent, surfactants, anti-static agents, pigments, a neutralizing agent, a thickener, a rheology modifier, a biocide, a fungicide, and combinations thereof.

19. A shoe stiffener formed from the article of claim 1.

* * * * *